(12) United States Patent
Geib

(10) Patent No.: US 7,969,988 B2
(45) Date of Patent: Jun. 28, 2011

(54) METHOD AND INDEPENDENT COMMUNICATIONS SUBNET FOR DETERMINING LABEL-SWITCHED ROUTES A COMMUNICATIONS SUBNET OF THIS TYPE

(75) Inventor: Ruediger Geib, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 639 days.

(21) Appl. No.: 11/917,860

(22) PCT Filed: May 18, 2006

(86) PCT No.: PCT/DE2006/000859
§ 371 (c)(1),
(2), (4) Date: Dec. 17, 2007

(87) PCT Pub. No.: WO2006/133669
PCT Pub. Date: Dec. 21, 2006

(65) Prior Publication Data
US 2008/0186978 A1    Aug. 7, 2008

(30) Foreign Application Priority Data
Jun. 16, 2005   (DE) .................. 10 2005 028 008

(51) Int. Cl.
*H04L 12/56* (2006.01)
(52) U.S. Cl. .................. 370/395.31; 370/238
(58) Field of Classification Search .................. 370/238, 370/395, 352, 400, 235; 709/238
See application file for complete search history.

(56) References Cited

U.S. PATENT DOCUMENTS

| | | | |
|---|---|---|---|
| 6,728,777 B1* | 4/2004 | Lee et al. | 709/238 |
| 7,362,763 B2* | 4/2008 | Wybenga et al. | 370/395.1 |
| 7,574,738 B2* | 8/2009 | Daude et al. | 726/15 |
| 7,616,574 B2* | 11/2009 | Previdi et al. | 370/238 |
| 2002/0194368 A1 | 12/2002 | Kon et al. | |
| 2003/0026268 A1* | 2/2003 | Navas | 370/400 |
| 2004/0215817 A1 | 10/2004 | Qing et al. | |
| 2004/0223497 A1* | 11/2004 | Sanderson et al. | 370/395.52 |
| 2005/0094636 A1 | 5/2005 | Lee et al. | |
| 2006/0155872 A1 | 7/2006 | Charzinski et al. | |
| 2007/0230346 A1* | 10/2007 | Yamada et al. | 370/235 |
| 2008/0002669 A1* | 1/2008 | O'Brien et al. | 370/352 |

FOREIGN PATENT DOCUMENTS

| | | |
|---|---|---|
| DE | 10238291 A1 | 3/2004 |
| EP | 1294202 A1 | 3/2003 |
| WO | WO01/15386 A2 | 3/2001 |

OTHER PUBLICATIONS

Lin Y-D et al: "QOS Routing Granularity in MPLS Networks" IEEE Communications Magazine, IEEE Service Center, New York, NY, US, vol. 40, No. 6, Jun. 2002, pp. 58-65, XP001123512 ISSN: 0163-6804 p. 1, right-hand column.

* cited by examiner

Primary Examiner — Thong Vu
(74) Attorney, Agent, or Firm — Kenyon & Kenyon LLP

(57) ABSTRACT

A method and system are provided for determining label-switched routes between a source router and a target router of an independent communications subnet, over which information packets having a predetermined IP target address are to be transmitted. An independent communications subnet suitable for implementing the method as well as to routers used therein also is provided. In an embodiment, the label-distributing multi-protocol, hitherto only used in IP backbone networks, is coupled with an internal subnet route protocol that is used in independent communications subnets so as to be able to design a more efficient and faster routing of information packets over different route topologies in an independent communications.

9 Claims, 3 Drawing Sheets

METHOD AND INDEPENDENT COMMUNICATIONS SUBNET FOR DETERMINING LABEL-SWITCHED ROUTES A COMMUNICATIONS SUBNET OF THIS TYPE

FIELD OF INVENTION

The present invention relates to a method for determining label-switched routes between a source router and a target router of an independent communications subnet, via which information packets having a predetermined IP target address are to be transmitted. The present invention furthermore relates to an independent communications subnet suitable for implementing the method as well as to routers used therein.

RELATED INFORMATION

Interconnected networks such as the internet, for example, are made up of independent communications subnets, also called autonomous systems, in order to be able to transmit any kind of data over long distances. In interconnected networks, the routing of information packets is very complex due to the heterogeneity of the communications subnets. Consequently, the use of a so-called two-stage routing algorithm was provided in interconnected networks. Accordingly, an internal subnet routing protocol, also known as an intra-domain routing protocol, is used within an independent communications subnet, and an external routing protocol, for example the external gateway protocol, also known as a border gateway protocol (BGP), is used between the communications subnets. At this point it should be mentioned already that the present invention only relates to the routing of packets within an independent communications subnet and not to the routing of packets between communications subnets.

The internal subnet routing protocols were developed further by the Internet Engineering Task Force (IETF). Today, so-called link-state protocols are primarily used such as the IS-IS protocol or the OSPF (open shortest path first) protocol, for example. The mentioned internal subnet routing protocols are described, for example, in the textbook "Computer Networks," $3^{rd}$ edition, Prentice Hall, pages 389ff, 454ff, by Andrew S. Tannenbaum.

With the aid of available internal subnet routing protocols, different route topologies may be set up between the source and target routers of an independent communications subnet so as to be able to transmit information, for example, as a function of their quality of service, over different routes. For this purpose, the communications subnet is represented in a manner known per se by a directed graph that has nodes (routers) and edges (paths). Each edge is then assigned a certain weight as a function, for example, of the distance, delay, and the like. From this information, subsequently the route topologies are determined, i.e. the different transmission paths between a source router and a target router which packets having a common target address may take.

In addition, available label-distributing protocols (LDP) are used primarily in multi-protocol label switching architectures (MPLS) for fast packet switching within IP-based backbone networks. In a label-distributing protocol, neighboring routers, beginning with the target router that was previously defined by an FEC target address, agree on path identifiers, also called labels, such that at the end of the label assignment a route is defined made up of several labeled paths between the source router and the target router. The manner of assigning labels may also be called downstream label distribution because the path identifiers are assigned counter to the direction of transmission of the packets. The downstream label distribution method includes, for example, the downstream on demand method and the downstream unsolicited method. Regarding an FEC target address, also called a forwarding equivalent class (FEC) address, the labels indicate which paths going into a router are logically connected to which paths going out of the router. The information required for this purpose is stored in routing tables of the respective routers.

SUMMARY OF INVENTION

Embodiments of the present invention provide a more efficient routing method for an independent communications subnet of an interconnected network.

An embodiment of the present invention provides for a coupling the label distribution protocol (LDP), hitherto only used in IP backbone networks, with an internal subnet routing protocol, which is used in independent communications subnets, so as to be able to design the routing of information packets over different route topologies in an independent communications subnet to be more efficient and faster.

In an embodiment according to the present invention, a method is provided for determining label-switched routes between a source router and a target router of an independent communications subnet, via which data packets having a predetermined target address are to be transmitted. First, using an IP-based internal subnet routing protocol, different route topologies within the communications subnet are calculated as a function of at least one parameter, for example the quality of service (QoS) of the data to be transmitted, a topology routing table for each route topology to which a router belongs being stored in this router. Subsequently, the route topologies and the associated routers are determined, via which the data packets having the predetermined IP target address are to be transmitted from the source router to the target router. Each route segment or path of a determined routing topology is then assigned a label, i.e., a path identifier, by using an available label distribution protocol, identified in the English technical literature as a label distribution protocol (LDP).

In a further embodiment, the label distribution protocol is frequently used in the multi-protocol label switching (MPLS) architecture, the internal subnet routing protocol being a link-state protocol, e.g., an IS-IS (intermediate system to intermediate system) or an OSPF (open shortest path first) routing protocol.

In order to determine routes in an independent communications subnet more efficiently, only those routers—generally also known as splitting points—that belong to multiple route topologies determine different labels for outgoing paths belonging to different route topologies. In an embodiment, target router may be assigned multiple target addresses, i.e., FECs. In this manner, packets can have different IP target addresses to be routed by the same label and thus over the same route from the router of origin to the target router.

An embodiment of the present invention provides a router that is appropriately adapted for use in an independent communications subnet. For example, the router has a device that executes an IP-based internal subnet routing protocol in order to determine different route topologies within an independent communications subnet as a function of at least one parameter, for example, of the quality of service (QoS) of the data to be transmitted. In a further embodiment, a device is provided that executes the label distribution protocol (LDP) in order to determine with every adjacent router belonging to the same route topology a label for the path lying between neighboring routers. At least one topology routing table and at least one label-based routing table may be stored in a memory device.

The present invention further provides a communications subnet for implementing the embodiments described herein.

DETAILED DESCRIPTION

Figure 1:
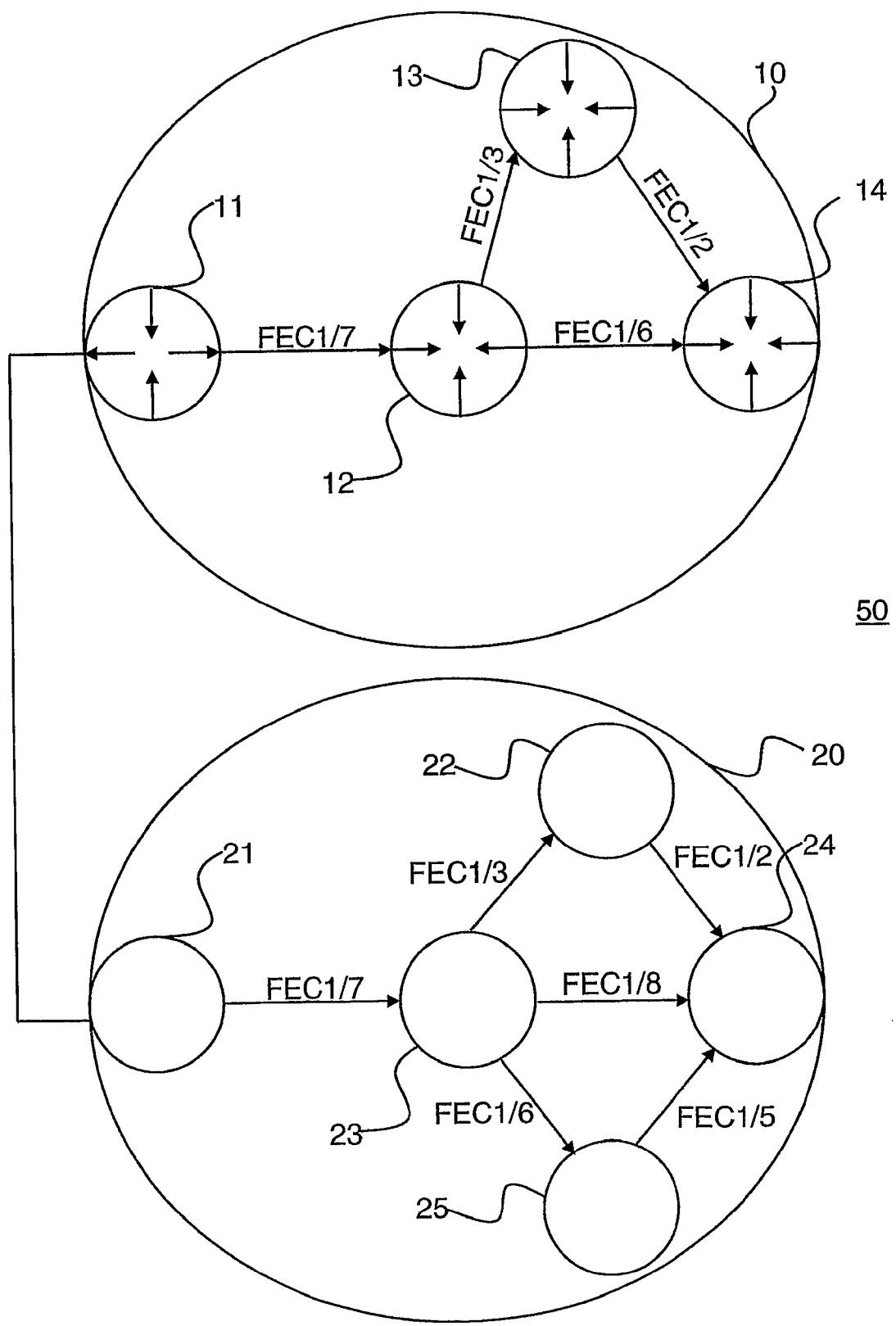
FIG. 1 shows an interconnected network having two independent communications subnets.

FIG. 1 shows an interconnected network 50, for example, the Internet, which includes two independent communications subnets 10 and 20. Independent communications subnets are also referred to as autonomous systems. Communications subnet 10 contains, for example, two border routers 11 and 14 as well as two internal routers 12 and 13, which are connected to one another in the manner shown. A border router is a router that is situated at the boundary of an independent communications subnet and that forms the interface to another independent communications subnet. Internal routers are routers that have no connection outside of a communications subnet. The two communications subnets allow for the transmission of MPLS packets that in addition to a label field comprising multiple bits also contain an EXP field comprising three bits, which defines, for example, the quality of service of a message to be transmitted.

In the example shown, independent communications subnet 20 has two border routers 21 and 24 as well as three internal routers 22, 23 and 25. The directed paths shown in communications subnets 10 and 20 point into the direction of transmission of MPLS packets to be transmitted. As is explained in more detail herein, each path is a component of a route topology, which is marked by at least one FEC target address FEC1 and a path identifier. A FEC address is IP address information that contains a prefix in addition to an IP address. A router knows not only the IP address, but according to the prefix the IP addresses following the IP address.

Below, the functionality of routing data packets within communications subnet 10 and within communications subnet 20 is explained in more detail.

An example with respect to communications subnet 10 is explained.

For example, information packets are to be routed from source border router 11 to target border router 14. It should be noted the information packets going into the target border router may be routed directly to the target user, into a different communications network or subnet. Although in the present example the two border routers 11 and 14 are used as source and target routers, internal routers may, of course, also be used as source and target routers.

First, the routers of communications subnet 10 determine multiple route topologies within communications subnet 10 by using an available internal subnet routing protocol and by taking into consideration different qualities of service of the information to be transmitted.

For this purpose, it is necessary to know the IP target address/prefix FEC1, under which information packets are to be transmitted to target border router 14. The IP target address/prefix FEC1 is a so-called forwarding equivalence class (FEC) address.

Figure 2A:
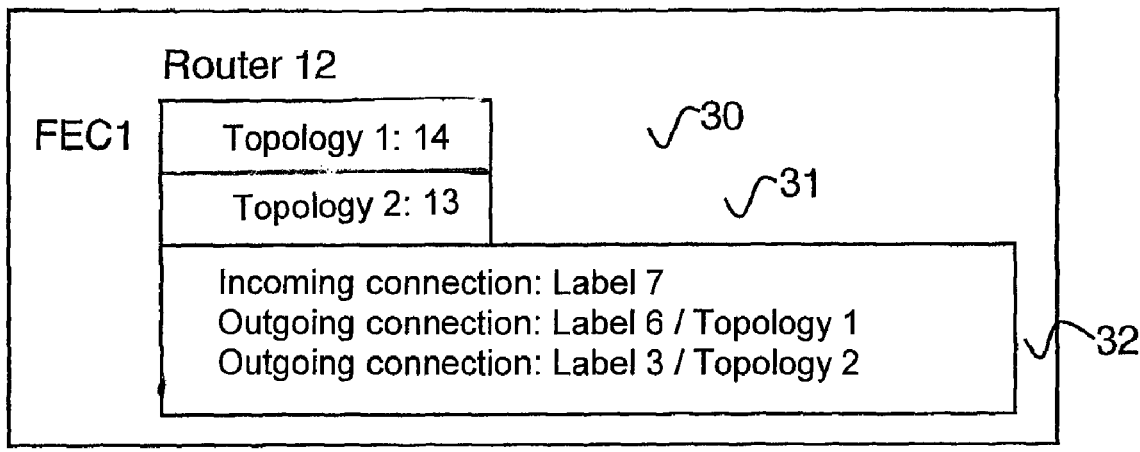
FIG. 2A shows an exemplary routing table for a router.

In a further embodiment, information is to be transmitted under the predetermined IP target address/prefix FEC1, which contain voice or data. With the aid of special weightings, which the network operator assigns to paths connecting the routers, the routers of communications subnet 10 are able to determine different route topologies for MPLS packets containing voice information or data by using an available or established internal subnet routing protocol. The information type in an MPLS packet is distinguished on the basis of the three EXP bits. For the IP target address/prefix FEC1, for example, a first route topology is defined from source border router 11 via internal router 12 to target border router 14 so as to be able to transmit voice information that demands short delay times. Furthermore, a second route topology is defined for the IP target address/prefix FEC1, which leads from source border router 11 via internal routers 12 and 13 to target border router 14, in order to be able to transmit data that do not contain voice information. Accordingly, two topology routing tables are stored in router 12 under the IP target address/prefix FEC1, as shown in FIG. 2A. In addition to IP target address/prefix FEC1, the subsequent router 14 is entered in the first topology routing table. In addition to IP target address/prefix FEC1, the subsequent router 13 is entered in the second topology routing table. Only references to the respectively one neighboring router are entered in border routers 11 and 14 as well as internal router 13 since for the information direction represented in the example each of these routers only has one single outgoing path. A corresponding routing table is shown for router 13 in FIG. 2b. A complete route topology thus results from the fact that the routing tables of several routers are read out in succession. The first route topology thus results from the routing tables of routers 11, 12 and 14, while the second route topology results from the routing tables of routers 11, 12, 13 and 14.

In the next step, path identifiers are now assigned to each route segment of the first and second routing topologies by using the label distribution protocol LDP, which is typically used only in IP backbone networks. In the process, path identifiers are assigned step by step to the routing segments, labels with the remaining routers being assigned beginning with target router 14 and ending with source router 11. For this purpose, target border router 14 first transmits IP target address/prefix FEC1 to its neighboring internal routers 12 and 13 in order to agree with them on suitable path identifiers. Following receipt of IP target address/prefix FEC1, the two internal routers 12 and 13 first check whether with respect to received IP target address/prefix FEC1 they are neighboring routers of target border router 14. Furthermore, internal routers 12 and 13 check whether they are part of one or more route topologies. Router 13 determines that it has only one single outgoing connection, e.g., to router 14. Accordingly, router 13 assigns label 2 to the outgoing path, as shown in FIG. 1. Internal router 12, by contrast, determines that it is part of two route topologies, via which the information packets having IP target address FEC1 are to be transmitted to target border router 14. Router 12 thus functions as a splitting point since incoming MPLS packets may be transmitted to different routers depending on the state of the three EXP bits. Furthermore, internal router 12 determines that target border router 14 is its direct neighbor which is also referred to as a next hop, and thus belongs to route topology 1. Only router 12, which belongs to several route topologies, must now determine several path identifiers and assign them to the respective paths. For example, router 12 assigns label 6 to the outgoing path of the first route topology, which ensures that information packets received with IP target address/prefix FEC1, which contain voice signals, are transmitted to target border router 14 via the path indicated by label 6. Multiple FECs associated with target border router 14 may be assigned to one label.

Figure 2B:
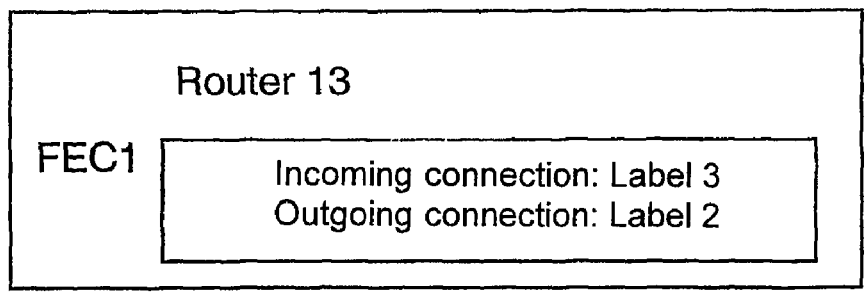
FIG. 2B shows an exemplary routing table for a router.

Router 12 furthermore detects that it is a direct neighbor of router 13, via which the second route topology runs to target border router 14. Regarding the second route topology, router 12 assigns label 3 to the outgoing path to router 13, as shown in FIG. 1. Router 13 now logically connects the incoming path indicated by label 3 to the outgoing path indicated by label 2 so as to be able to transmit information packets having IP target address/prefix FEC1 to target border router 14. The associated routing table stored in router 13 is shown in FIG. 2B.

In the next step, router 12 now transmits received IP target address/prefix FEC1 to source border router 11, which in turn checks whether it is the nearest router to internal router 12. Source border router 11 determines that with respect to IP target address/prefix FEC1 it has only one connection to router 12. Thereupon, router 11 informs router 12 that information packets having IP target address/prefix FEC1 are transmitted via the path indicated by label 7 regardless of the quality of service. Router 12 in turn stipulates that the information packets having IP target address/prefix FEC1, which come in via the path indicated by label 7, are to be transmitted directly to target border router 14 via the route segment indicated by label 6 if the information packet contains voice signals. By contrast, an information packet having IP target address/prefix FEC1 is to be transmitted to router 13 over the second route topology, i.e., over the route segment indicated by label 3, if the information packets contain data. The corresponding routing tables are shown in FIGS. 2a and 2b for router 12 and router 13, respectively.

After the routes between source border router 11 and target border router 14 have been determined, MPLS packets having IP target address/prefix FEC1 may be directed over communications subnet 10 with the aid of the assigned labels. In order to find the right route, the label field and, if indicated, the three EXP bits in the MPLS packets to be transmitted are analyzed. Only router 12 must be activated to analyze also the EXP bits in an MPLS packet. For router 12 is to transmit, as a function of the information type, i.e. voice or data information, MPLS packets over different routes to target border router 14.

The following is another example embodiment with respect to communications subnet 20.

Communications subnet 20 differs from communications subnet 10 by the fact that three internal routers 22, 23 and 25 exist, internal router 23 having three outgoing paths, while corresponding router 12 of communications subnet 10 only has two outgoing paths if a direction of communication from left to right is taken as a basis.

Figure 3:
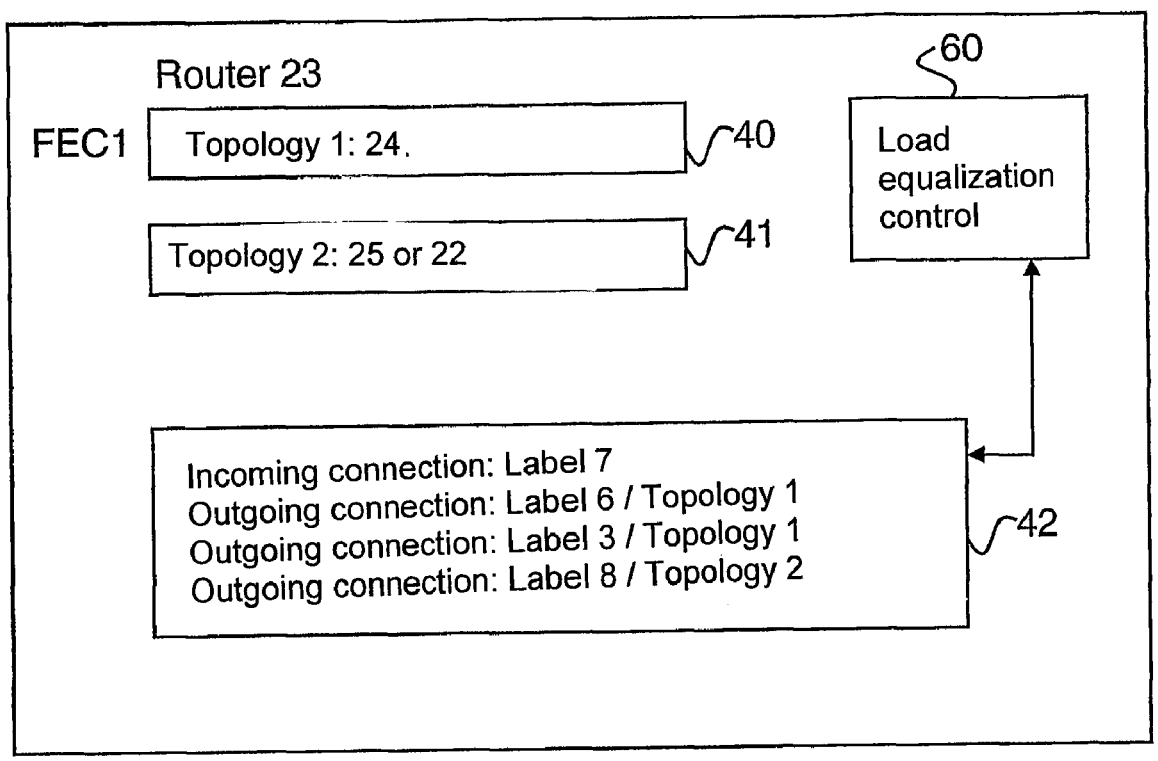
FIG. 3 shows an exemplary routing table for a router.

The determination of the different route topologies and the assignment of labels to the route segments of the different route topologies occurs in a similar manner as was described with respect to communications subnet 10. A difference is that internal router 23 takes a load compensation into account. This means that, for example, for the determined second route topology, which is provided for the transmission of data packets, a route is defined over routers 21, 23, 22 and 24 and alternatively over routers 21, 23, 25 and 24. Accordingly, router 23 ensures that, as a function of the load state of communications subnet 20, router 23 transmits the data-containing information packets received over the path indicated by label 7 for example uniformly over routers 22 or 25 to target border router 24. The routing tables required for this purpose from router 23 are shown in FIG. 3.

By contrast, voice packets having IP target address/prefix FEC1 are transmitted by router 23 directly to target border router 24. At this point it should be mentioned that algorithms for taking into account the traffic load when routing information packets are known and are thus not explained in more detail. A load equalization control device 60, which is able to execute corresponding algorithms, is provided in router 23, as shown in FIG. 3.

After the routes between source border router 21 and target border router 24 have been determined, MPLS packets having IP target address/prefix FEC1 may be transmitted over communications subnet 20. In order to find the right route, the label field and, if indicated, the three EXP bits in the MPLS packets to be transmitted are analyzed. Only router 23 must be activated to analyze also the EXP bits in an MPLS packet. For router 23 is to transmit, as a function of the information type, i.e., voice or data information, MPLS packets over different routes to target border router 24.

What is claimed is:

1. A method for determining label-switched routes between a source router and a target router of an independent communications subnet, over which information packets having a predetermined target address are to be transmitted, comprising:
   as a function of at least one parameter, calculating different route topologies within the communications subnet using an IP-based internal subnet routing protocol, a topology routing table for each route topology to which a router belongs being stored in this router;
   determining the route topologies and the associated routers, over which the information packets having the predetermined target address are to be transmitted from the source router to the target router; and
   using the conventional label distribution protocol, assigning a label to each path that belongs to a determined route topology.

2. The method as recited in claim 1, wherein the label distribution protocol is used in a multi-protocol label switching (MPLS) architecture, the internal subnet routing protocol being a link-state protocol.

3. The method as recited in claim 2, further comprising transmitting MPLS information packets that contain a label field and an EXP field over the independent communications subnet.

4. The method as recited in claim 3, further comprising analyzing by the routers the label field and the EXP field of the received MPLS packets.

5. The method as recited in claim 2, wherein the internal subnet routing protocol is at least one of an intermediate system to intermediate system routing protocol and an open shortest path first routing protocol.

6. The method as recited in claim 1, further comprising determining by the routers that belong to multiple route topologies different labels for outgoing paths.

7. The method as recited in claim 1, wherein the at least one parameter is a quality of service (QoS) of the information to be transmitted.

8. A router for use in an independent communications subnet, including a device that executes an IP-based internal subnet routing protocol in order to determine different route topologies within an independent communications subnet as a function of at least one parameter, in particular of the quality of service (QoS) of the information to be transmitted;
   a device that executes the label distribution protocol in order to determine with every neighboring router belonging to the same route topology a label for the path lying between neighboring routers; and
   a memory device for storing at least one topology routing table and at least one label-based routing table.

9. An independent communications subnet for implementing a method for determining label-switched routes between a source router and a target router of an independent communications subnet, over which information packets having a predetermined target address are to be transmitted, comprising:
 as a function of at least one parameter, different route topologies within the communications subnet are calculated using an IP-based internal subnet routing protocol, a topology routing table for each route topology to which at least one of the source router and target router belongs being stored in the respective associated router;
 the route topologies and the associated routers are determined, over which the information packets having the predetermined target address are to be transmitted from the source router to the target router;
 using a label distribution protocol, a label is assigned to each path that belongs to a determined route topology.

* * * * *